(12) United States Patent
Kim et al.

(10) Patent No.: US 8,175,776 B2
(45) Date of Patent: May 8, 2012

(54) SYSTEM AND METHOD FOR CONTROLLING AUTOMATIC LEVELING OF HEAVY EQUIPMENT

(75) Inventors: Jin Seop Kim, Changwon-si (KR); Chang Soo Lee, Changwon-si (KR); In Woo Kim, Changwon-si (KR)

(73) Assignee: Volvo Construction Equipment Holding Sweden AB, Eskilstuna (SE)

( * ) Notice: Subject to any disclaimer, the term of this patent is extended or adjusted under 35 U.S.C. 154(b) by 802 days.

(21) Appl. No.: 12/239,843

(22) Filed: Sep. 29, 2008

(65) Prior Publication Data

US 2009/0088933 A1    Apr. 2, 2009

(30) Foreign Application Priority Data

Oct. 2, 2007  (KR) ........................ 10-2007-0099265

(51) Int. Cl.
*G06F 7/70* (2006.01)
*G06F 19/00* (2006.01)
*G06G 7/00* (2006.01)
*G06G 7/76* (2006.01)

(52) U.S. Cl. ........................................................ 701/50

(58) Field of Classification Search ............. 280/DIG. 1, 280/6.15, 6.154, 6.159, 5.5, 5.507, FOR. 100, 280/FOR. 101; 180/89.13–89.15; 296/190.01; 701/50

See application file for complete search history.

(56) References Cited

U.S. PATENT DOCUMENTS 5,988,654 A    11/1999   Wix et al.
6,105,699 A     8/2000   Hinds

FOREIGN PATENT DOCUMENTS

WO      99/01329       1/1999
WO    2008/016310      2/2008

*Primary Examiner* — Christopher J. Novosad
(74) *Attorney, Agent, or Firm* — Ladas & Parry LLP (57) ABSTRACT

A system and method for controlling automatic leveling heavy construction equipment. The system has a lower frame and an upper frame, the lower frame having a traveling unit, and the upper frame being tiltably and swingably connected to the lower frame. The system comprises a sensor unit, provided in the equipment, including an inclination detecting sensor for measuring twist angles of the lower frame and the upper frame against a reference horizontal surface, a traveling detection sensor for measuring a traveling speed of the equipment, and a working device sensor for detecting working state information of a working device. A control unit receives the twist angles, the traveling speed, and the working state information, calculates a corrected angle at which the upper frame is to be tilted against the lower frame, and generates a control signal for instructing an operation of an actuator. A driving unit performs a leveling control through the actuator in accordance with the received control signal.

14 Claims, 8 Drawing Sheets

SYSTEM AND METHOD FOR CONTROLLING AUTOMATIC LEVELING OF HEAVY EQUIPMENT

CROSS-REFERENCE TO RELATED APPLICATION

This application is based on and claims priority from Korean Patent Application No. 10-2007-0099265, filed on Oct. 2, 2007 in the Korean Intellectual Property Office, the disclosure of which is incorporated herein in its entirety by reference.

BACKGROUND OF THE INVENTION

1. Field of the Invention

The present invention relates to a system and method for controlling automatic leveling of heavy equipment, and more particularly to a system and method for controlling automatic leveling of heavy equipment, which can maintain a horizontal level of the lower frame of the equipment by automatically adjusting the leveling state of the lower frame when the leveling state of the lower frame is changed.

2. Description of the Prior Art

In heavy equipment, such as an excavator, a logging device, a crane, and the like, which is working on an inclined site, an upper frame is inclined to a horizontal surface depending on the ruggedness of ground.

When the heavy equipment is in an inclined state, inclination of an upper frame to a horizontal surface is changed as the upper frame is swiveled, and this causes the work to be done in an unstable state of the equipment. Also, as the center of gravity of the equipment is moved, the danger of overturning of the heavy equipment is increased.

In order to solve this problem, a method of moving the center of gravity of the heavy equipment near to ground through tilting of an upper frame on an inclined site has been used.

As a recent technology related to the above-described method, U.S. Pat. No. 6,609,581 discloses a tilt mechanism having an upper support being supported and tilted by two hydraulic cylinders.

Also, U.S. Pat. No. 6,158,539 discloses two hydraulic cylinders, upper bearing body support plate connected to a center tilt shaft, and a lower plate.

In the case of putting the heavy equipment on a trailer so as to move the heavy equipment using such tilt means to another place, it is required for the upper frame to keep a horizontal level with the lower frame provided with a traveling means.

In this case, a user should manually perform the leveling operation, and this causes the user inconvenience.

SUMMARY OF THE INVENTION

Accordingly, the present invention has been made to solve the above-mentioned problems occurring in the prior art while advantages achieved by the prior art are maintained intact.

One object of the present invention is to provide a system and method for controlling automatic leveling heavy equipment, which can automatically level an upper frame on the basis of the lower frame.

Another object of the present invention is to provide a system and method for controlling automatic leveling heavy equipment, which can immediately stop a tile control through a user's direct participation if an emergency occurs during an automatic tilt control process.

Still another object of the present invention is to provide a system and method for controlling automatic leveling heavy equipment, which can mitigate vibration or impact caused by an abrupt stop of tilting depending on the inclination of an upper frame.

In order to accomplish these objects, there is provided a system for controlling automatic leveling of heavy equipment with a lower frame and an upper frame, the lower frame having traveling means, and the upper frame tiltably and swingably connected to the lower frame, the system comprising: a sensor unit, provided in the equipment, including an inclination detecting sensor for measuring twist angles (i.e. pitching angles and rolling angles) of the lower frame and the upper frame against a reference horizontal surface, a traveling detection sensor for measuring a traveling speed of the equipment and a working device sensor for detecting working state information of a working device; a control unit for receiving the twist angles, the traveling speed, and the working state information, calculating a corrected angle at which the upper frame is to be tilted against the lower frame, and generating a control signal for instructing an operation of an actuator; and a driving unit for performing a leveling control through the actuator in accordance with the received control signal.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, a system and method for controlling automatic leveling heavy equipment according to preferred embodiments of the present invention will be described with reference to the accompanying drawings. The matters defined in the description, such as the detailed construction and elements, are nothing but specific details provided to assist those of ordinary skill in the art in a comprehensive understanding of the invention, and thus the present invention is not limited thereto.

In the drawings, the reference numeral "210" denotes a reference horizontal surface, "220" denotes an extended horizontal surface of an upper frame, and "230" denotes an extended horizontal surface of a lower frame.

In the following description of the present invention, the same drawing reference numerals are used for the same elements across various figures.

The term "twist angle" used in the description includes a pitching angle in forward/backward direction and a rolling angle in a left/right direction. Unless the rolling angle and the pitching angle are used in distinction from each other, the twist angle means the pitching angle and the rolling angle.

Also, the term "reference horizontal surface" means a horizontal surface in a direction of gravity.

Figure 1:
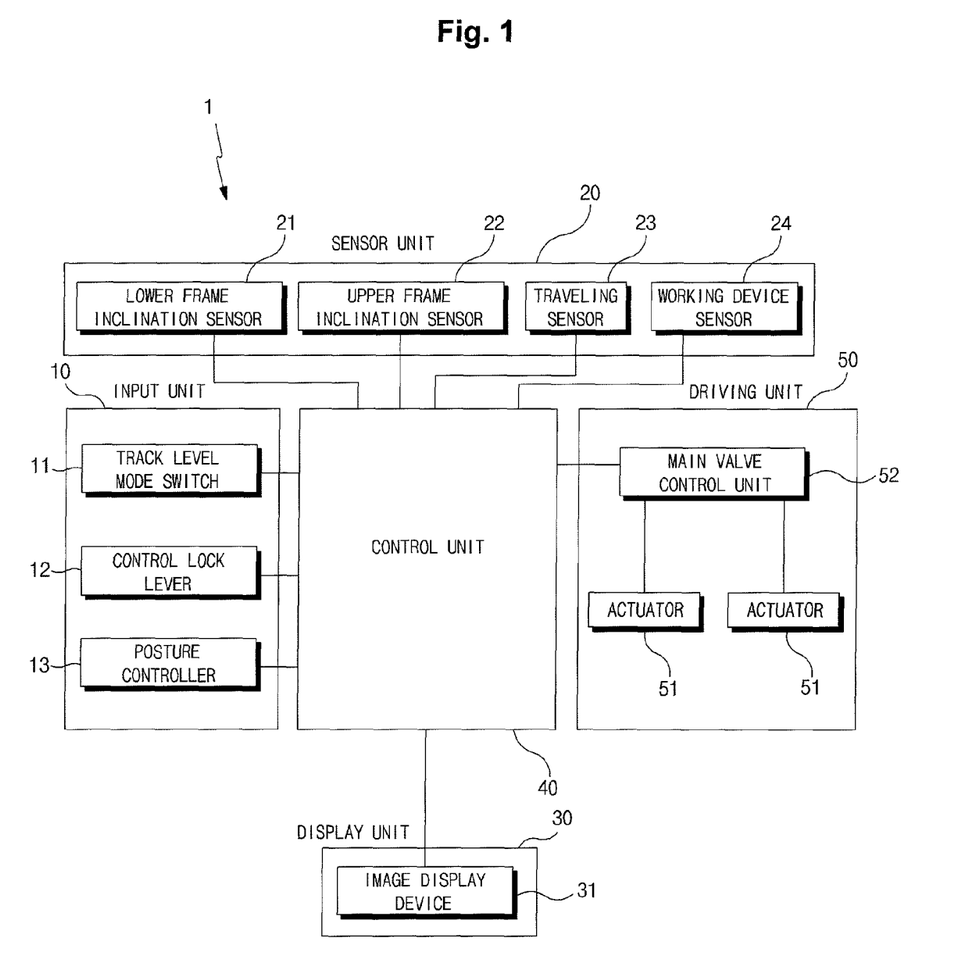
FIG. 1 is a block diagram of a system for controlling automatic leveling of heavy equipment according to an embodiment of the present invention.

A system 1 for controlling automatic leveling of heavy equipment according to an embodiment of the present invention includes an input unit 10, a sensor unit 20, a display unit 30, a control unit 40, and a driving unit 50.

The input unit 10 includes a track level mode switch 11 for commanding leveling of an upper frame on the basis of a lower frame 101, a control lever 12, and a posture controller 13 in the form of a stick.

The track level mode switch 11 serves to control tilting of the upper frame 104 against the lower frame 101, and if the track level mode switch 11 is in an off state (i.e. inactive state) during the leveling control process, it serves as an input means of an emergency stop condition to immediately terminate the leveling control.

On the other hand, a control lock lever 12, if it is in an on state (i.e. active state), judges that the emergency stop condition is satisfied and immediately stop the leveling control, while if it is in an off state (i.e. inactive state), it performs a normal leveling control.

Also, the control lock lever may be used as a general safety device that does not perform an automatic leveling control in consideration of its activation/inactivation state as the conditions precedent of leveling control to be described later.

On the other hand, the posture controller 13 is an input device for performing the tilting of the upper frame in accordance with a user's manipulation.

In the sensor unit 20, inclination detecting sensors 21 and 22, a traveling detection sensor 23, and a working device sensor 24 may be provided. The inclination detecting sensors 21 and 22 are mounted on the lower frame and the upper frame, respectively. The inclination detecting sensor 21 of the lower frame measures a twist angle of the lower frame on the basis of a reference horizontal surface 210, and the inclination detecting sensor 22 on the upper frame measures a twist angle (i.e. a pitching angle and a rolling angle) of the upper frame on the basis of the reference horizontal surface.

The traveling detection sensor 23 measures a traveling speed of the heavy equipment through a traveling means of the lower frame.

The twist angles of the upper frame and the lower frame, and the traveling speed, which are measured by the sensor unit 20, are transferred to the control unit 40 as control variables for leveling control.

A working device sensor 24 detects whether the working device, which is coupled to a boom of the upper frame, such as a logging header, a bucket, and the like, is in an operation state, and outputs corresponding working state information.

The display unit 30 presents the respective twist angles to a user through a video display device 31. Through the display unit 30, a user can observe a leveling control process, and, if needed, can terminate the corresponding leveling control by satisfying an emergency stop condition through manipulation of the input unit 10. That is, the display unit 30 presents the current posture of the heavy equipment to the user in real time, so that the user can monitor whether the leveling control system malfunctions, or take part in automatic leveling control.

On the other hand, the driving unit 50 may include an actuator 51 using at least one hydraulic pressure for tilting the upper frame, and a main valve controller 52 for distributing the control signal to respective hydraulic valves for operating the actuator 51 in the case where a plurality of actuators is additionally provided. The actuators of the driving unit 50 may be of a hydraulic pressure type or an air pressure type, and instead of the actuator, an electric motor may be used as a tilting means.

The control unit 40 generates a necessary control signal by computing an operation period of the actuator 51 for leveling control from the twist angle measured by the sensor unit 20, and transmits the generated control signal to the main valve controller 52.

Figure 2:
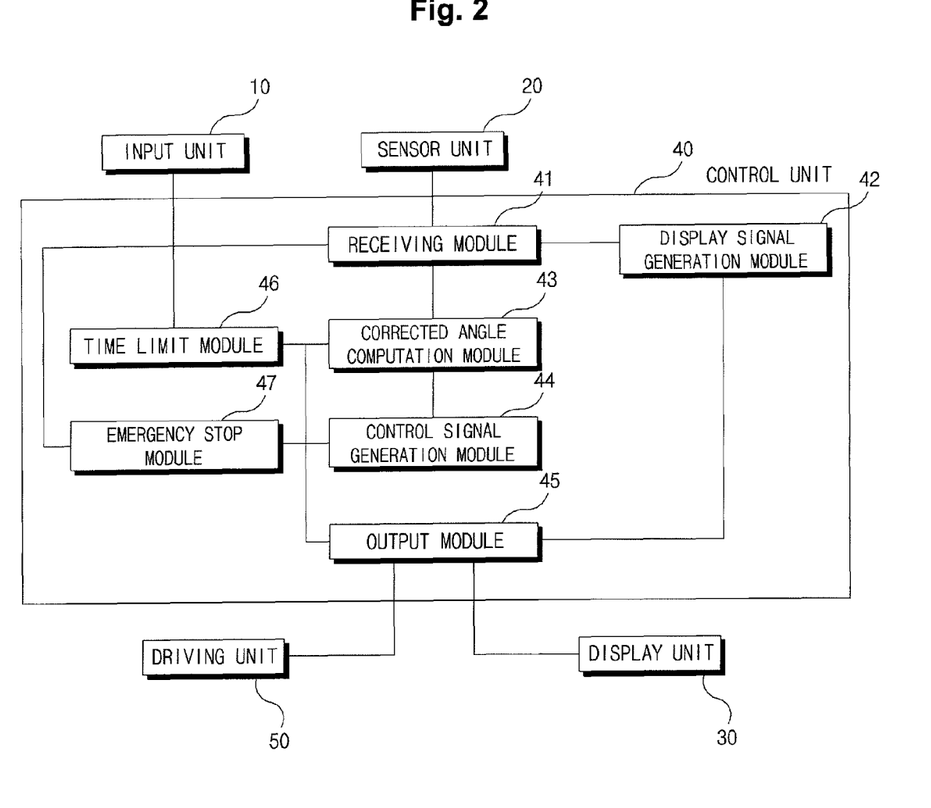
FIG. 2 is a block diagram illustrating the construction of a control unit as illustrated in FIG. 1.
Figure 3:
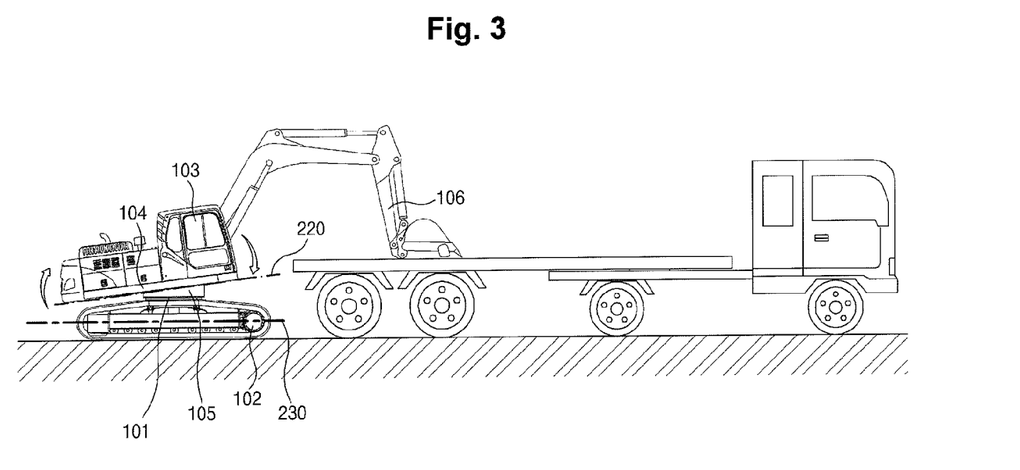
FIG. 3 is a side view of heavy equipment adopting a system for controlling automatic leveling of heavy equipment according to an embodiment of the present invention.

The control unit 40 may include a receiving module 41, a display signal generation module 42, a corrected angle computation module 43, a control signal generation module 44, an output module 45, and a time limit module 46.

The receiving module 41 receives the twist angles, the traveling speed, and the working state information measured by the sensor unit 20, and transmits the received signals to the display signal generation module 42, the corrected angle computation module 43, and the control signal generation module 44.

The display signal generation module 42 generates a display signal for displaying the twist angles against the respective reference horizontal surfaces of the lower frame and the upper frame through the display unit 30.

On the other hand, the corrected angle computation module 43 determines the twist angle of the upper frame as a first twist angle 201, and computes a corrected angle that is an angle displacement to be applied from the first twist angle 201 to the upper frame for the leveling control.

Figure 6:
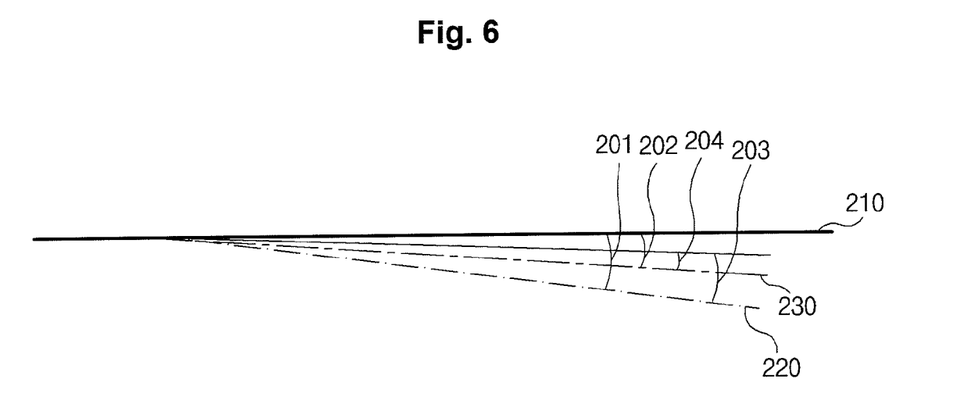
FIG. 6 is a view briefly illustrating various angles according to a system and method for controlling automatic leveling heavy equipment according to an embodiment of the present invention.

The first twist angle 201 includes a pitching angle and a rolling angle against the reference horizontal surface of the upper frame, and the target of the leveling control according to the present invention is to make the pitching angle and the rolling angle equal to the twist angle 202 of the lower frame.

The corrected angle 203 is calculated using the first twist angle 201 and the twist angle 202 of the lower frame as parameters.

The corrected angle 203 is determined by the following condition 1 on the basis of the twist angle of the lower frame.

Corrected Angle=Twist Angle of Lower Frame−First Twist Angle (Condition 1)

On the other hand, the corrected angle can be calculated based on angle obtained by adding a weight value angle (i.e. a pitching angle and a rolling angle) optionally added by a user to the twist angle of the lower frame, rather than based on the twist angle of the lower frame. In this case, the corrected angle is determined by the following condition 2.

Corrected Angle=Twist Angle of Lower Frame+ Weight Angle−First Twist Angle (Condition 2)

Here, the weight angle corresponds to the pitching angle and the rolling angle that are added to the twist angle of the lower frame. Due to the weight angle, the target of the level controlling is changed from making the upper frame parallel to an extended surface of the lower frame to performing further pitching or rolling as much as the weight angle. That is, since the basis of obtaining the corrected angle is changed from "the twist angle of the lower frame" to "the twist angle of the lower frame+the weight angle", the corrected angle, to which the weight angle has been added, is calculated.

Consequently, if it is assumed that the weight angle is set to 0° in the case where the weight angle is not set by a user, the corrected angle can be generalized and calculated by the above-described condition 2.

For example, if the pitching angle 202 of the lower frame is 0° (in the case where the target is the horizontal level against the reference horizontal surface), and the pitching angle 201 of the upper frame is −13°, it is assumed that the first twist angle is −13° and the weight angle is 0°, and thus the corrected angle according to the condition 2 or the condition 1 becomes +13°.

As another example, with reference to FIG. 6, if the pitching angle 202 of the lower frame is −10°, the weight angle is the pitching angle +2°, and the pitching angle 201 of the upper frame is −20°, the corrected angle becomes +12° according to the condition 2.

On the other hand, the control signal generation module 44 determines the operation period of the actuator 51 in the driving unit according to the corrected angle, and generates the control signal according to the operation period.

In this case, if a plurality of actuator is provided in the driving unit, the compensation relations among the actuators should be considered in accordance with the pitching angle and the rolling angle of the corrected angle.

Figure 4:
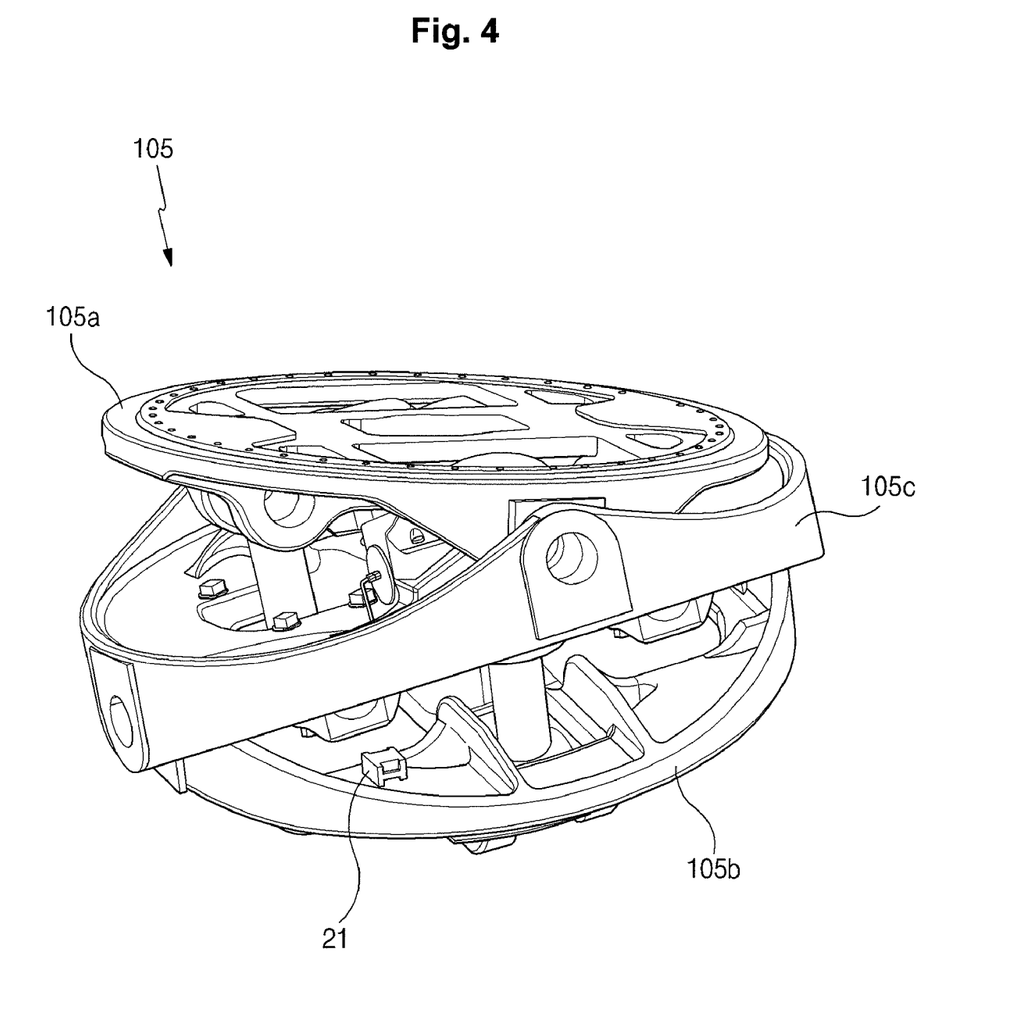
FIG. 4 is a perspective view of a tilting means of heavy equipment as illustrated in FIG. 3.
Figure 5:
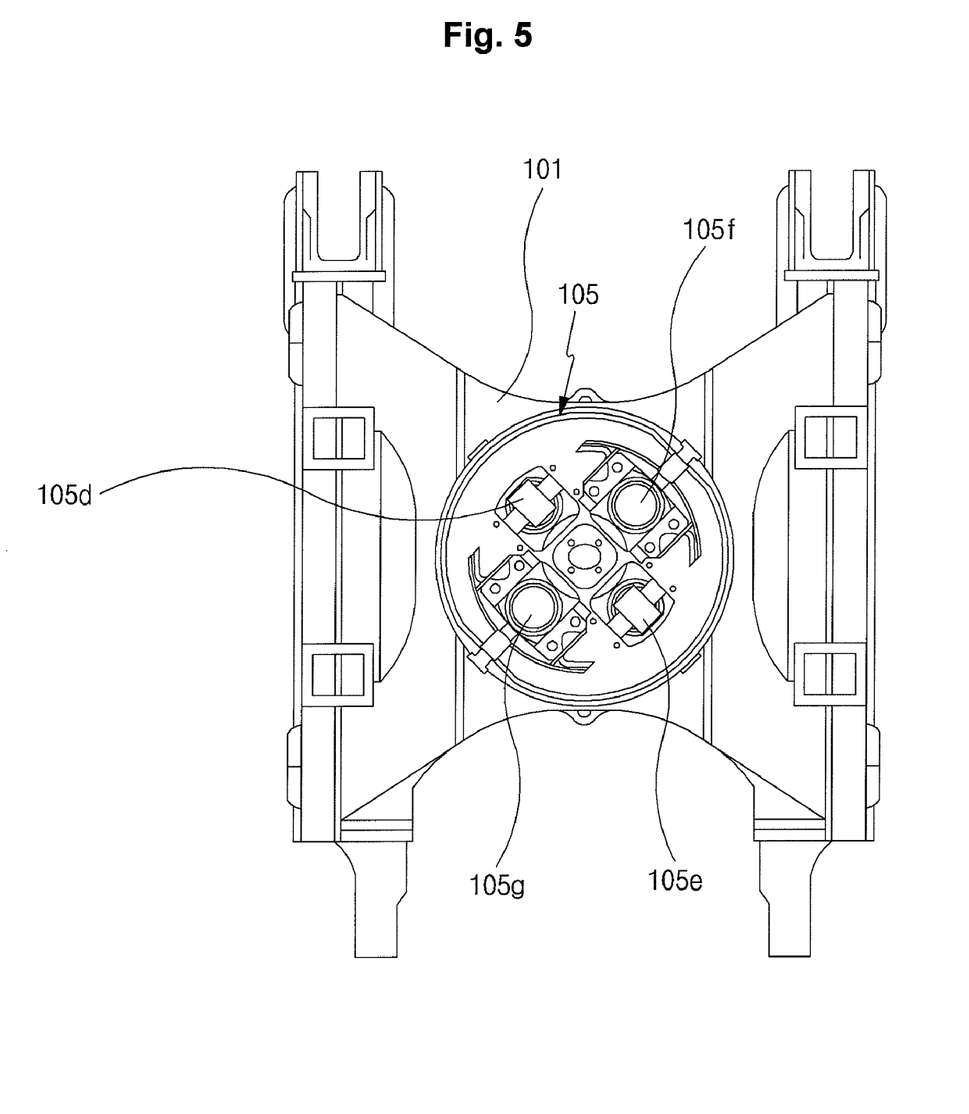
FIG. 5 is a sectional view of a tilting means and a lower frame of heavy equipment as illustrated in FIG. 3.

For example, as illustrated in FIG. 4, the tilting means 105 is provided with a swing bearing mount frame 105a to which the upper frame is rotatably coupled, a support frame 105b fixed to the lower frame, and a tilt frame 105c for connecting the swing bearing mount frame to the support frame. The swing bearing mount frame and the support frame have a construction in which for actuators are provided. In this case, as illustrated in FIG. 5, the four actuators are installed in slanting lines.

In order to increase the front pitching angle in the tilting means 105 provided with four actuators 105d, 105e, 105f, and 105g, it is required that two front actuators 105d and 105f are extended, and in proportion to this extension, two rear actuators 105e and 105g are contracted. In order to increase the right rolling angle, it is required that two right actuators 105e and 105f are extended and in proportion to this extension, two left actuators 105d and 105g are contracted.

In order to increase/decrease the first twist angle according to the corrected angle determined by a certain pitching angle and rolling angle in the above-described method, the operation period is determined from the mutual displacement relations among the actuators predetermined according to the tilting means.

On the other hand, the currently extended length of the respective actuators 51 that can be analogized from a difference between the twist angle of the lower frame and the twist angle of the upper frame may be determined as an initial value of the control signal, and the control signal corresponding to the intermittent time of a hydraulic valve that operates the corresponding actuator is generated in accordance with the operation period determined by the corrected angle 203 as described above.

Figure 7:
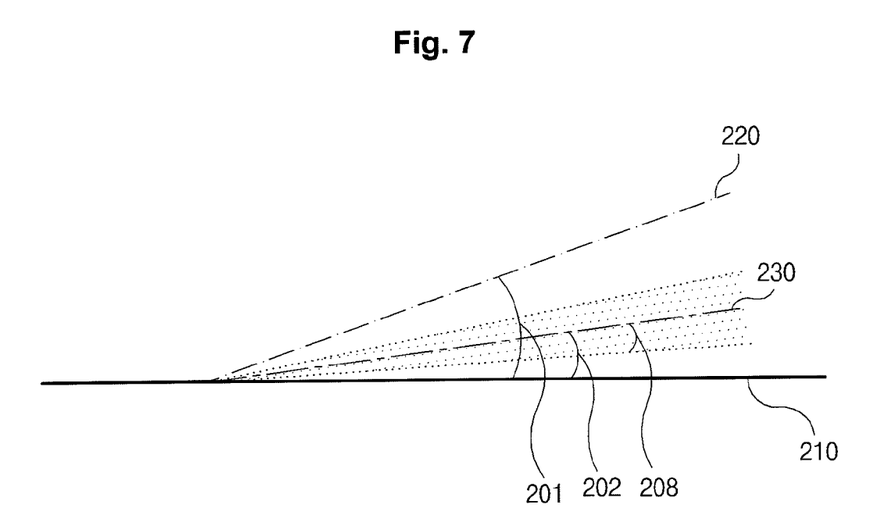
FIG. 7 is a view illustrating a reference convergence range according to a system and method for controlling automatic leveling heavy equipment according to an embodiment of the present invention.

In this case, the control signal may be divided into a first control signal for operating the actuator at normal speed and a second control signal for operating the actuator at low speed, in accordance with the degree of convergence of the first twist angle to the twist angle of the lower frame (or an angle obtained by adding a weight angle to the twist angle if the weight angle is not 0°).

More specifically, in order to protect a user from an impact caused by an abrupt stopping of the actuator in a state that the first twist angle 201 is near the twist angle 202 of the lower frame, the second control signal for operating the actuator at low speed is generated.

If the first twist angle 201 converges within a specified range of the twist angle of the lower frame, the control signal is changed from the first control signal to the second control signal. For this, the specified range of the twist angle of the lower frame (hereinafter referred to as "speed convergence range") is determined according to the following condition 3.

Twist Angle of Lower Frame−Constant Angle≦Speed Convergence Range≦Twist Angle of Lower Frame+Constant Angle    (Condition 3)

Here, the constant angle 205 is an angle in a speed reduction period determined by user's optional setting.

In this case, if the weight angle has been set, the speed convergence range is determined by the following condition 4.

Twist Angle of Lower Frame+Weight Angle−Constant Angle≦Speed Convergence Range≦Twist Angle of Lower Frame+Weight Angle+Constant Angle    (Condition 4)

In the case of condition 4, the angle that is the basis of the leveling control is calculated as the speed convergence range reflecting that the basic angle has been changed to "the twist angle of the lower frame+weight angle".

As described above, if the first twist angle converges within the range of "the twist angle of the lower frame±constant angle" or the range of "the twist angle of the lower frame±weight angle±constant angle", the second control signal for operating the actuator at low speed is generated.

On the other hand, the output module 45 transmits the display signal to the display unit 30, and transmits the control signal (or the first control signal or the second control signal) to the main valve controller 52.

The time limit module 46 limits the time for performing the leveling control in a manner that the leveling control is performed in a predetermined operation time, and after the lapse of the operation time, the leveling control is terminated. Even in a state that the heavy equipment is stopped, the first twist angle 201 is continuously sensed due to vibration caused by the working or vibration of the heavy equipment itself, and thus the time limit module 46 is to compulsorily terminate the leveling control of the upper frame after the lapse of the predetermined time.

Thereafter, if the leveling of the lower frame is not completed, the user can manually perform the leveling of the upper frame.

On the other hand, if an emergency, in which a normal leveling control is not performed, occurs due to an abnormal state of the sensor or the output during the leveling control, user's direct participation in the control process may be taken through the following construction. The control unit 40 may further include an emergency stop module 47 for stopping the leveling control by judging whether an emergency stop condition is satisfied.

The emergency stop condition is judged by the activation/inactivation of the control lock lever, variation of the posture controller, on/off state of the track level mode switch, operation state of the working device, or the traveling state of the traveling means.

That is, while a user performs a leveling control by turning on the track level mode switch and observes a leveling control process through the display unit 30, he/she can input the activation of the control lock lever, variation of the posture controller, or turn-off of the track level mode switch through the input means.

In this case, the emergency stop module 47 recognizes the activation of the control lock lever 12 inputted from the user, the input of a tilting command according to the variation of the posture controller, or the turn-off of the track level mode switch, and immediately terminates the tilting control.

Also, the emergency stop module immediately terminates the tilting control when it recognizes that the working device is in a working state through the working state information inputted from the working device.

Accordingly, interference becomes possible during the user's leveling control process, and thus the safety of the equipment is increased.

Hereinafter, a method for controlling automatic leveling of heavy equipment according to an embodiment of the present invention will be described in detail with reference to the accompanying drawings.

Figure 8:
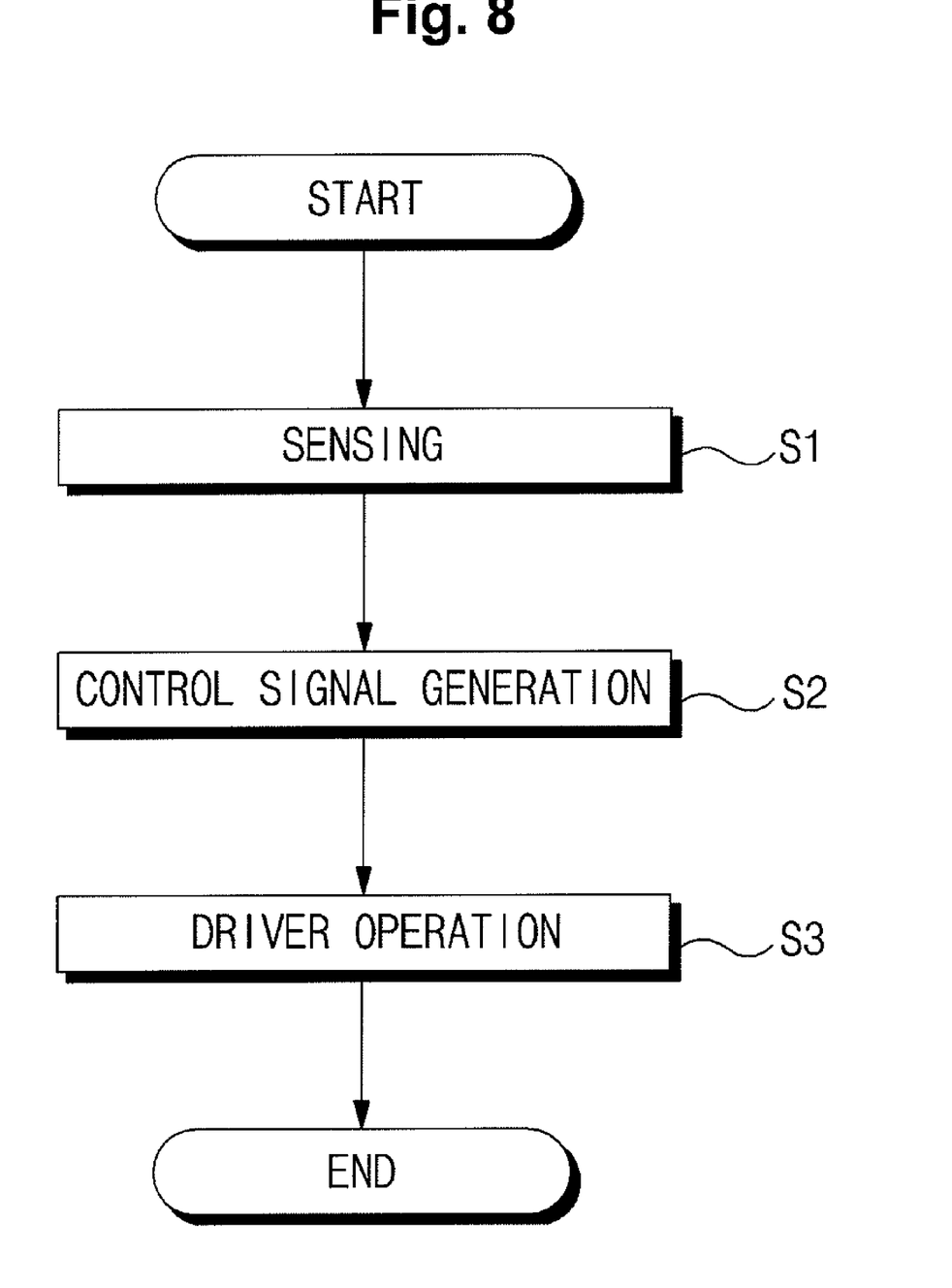
FIG. 8 is a flowchart roughly illustrating a method for controlling automatic leveling of heavy equipment according to an embodiment of the present invention.

The method for controlling automatic leveling of heavy equipment according to an embodiment of the present invention briefly includes a sensing step s1, a control signal generation step s2, and a driver operation step s3.

More specifically, the method for controlling automatic leveling of heavy equipment in which a lower frame having a traveling means and an upper frame are combined together by a tilting means that includes a sensor unit, a control unit, and a driving unit, which includes the steps of (A) the sensor unit measuring twist angles (i.e. pitching angles and rolling angles) of the lower frame and the upper frame against a reference horizontal surface as an inclination detecting sensor of the lower frame and the upper frame, measuring a traveling speed of the equipment as a traveling detection sensor, and detecting working state information of a working device; (B) the control unit calculating a corrected angle at which the upper frame is to be leveled against the lower frame based on the respective twist angles, generating a control signal for operating an actuator according to the corrected angle, and transmitting the control signal to the driving unit; and (C) the driving unit performing a leveling control through the actuator on the basis of the control signal. Thereafter, within a limited range of operating time, a loop is controlled through the steps (A), (B), and (C) by sensing the respective twist angles again.

Figure 9:
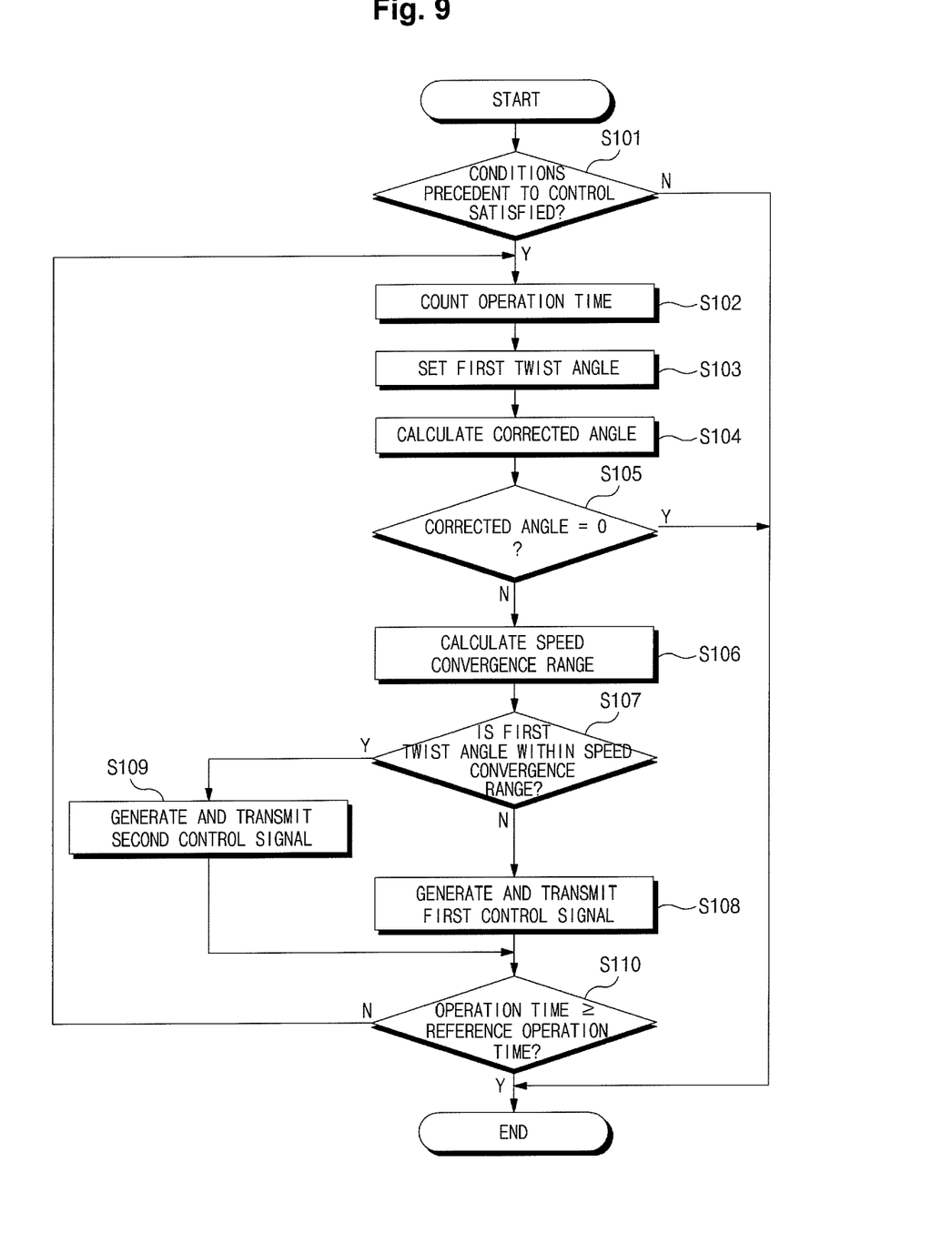
FIG. 9 is a flowchart illustrating a step of generating a control signal adopted in a method for controlling automatic leveling of heavy equipment as illustrated in FIG. 8 according to an embodiment of the present invention.

Hereinafter, the step (B) will be described in detail.

First, it is judged whether conditions precedent of leveling control is satisfied, and if the conditions precedent of leveling control is not satisfied, the leveling control is terminated (step s101).

In this case, whether the conditions precedent to leveling control is satisfied is judged by independently judging whether the control lock lever is in an active state, whether the posture controller is in a center position, whether the working device is in a working state, and whether the lower frame is traveling. In this case, if all the conditions, including an inactive state of the control lock lever, no tilting input due to the posture controller located in the center, no working state of the working device, and stop state of the lower frame, are satisfied, it is judged that the conditions precedent to leveling control are satisfied. If all the conditions precedent to leveling control are satisfied, the next step is performed, while if any one condition among the above-described conditions is not satisfied, the corresponding leveling mode is terminated, and the track level mode switch is turned off.

A step (b1) starts counting of an operation time for limiting the tilting control time if the conditions precedent to leveling control are satisfied (step s102).

A step (b2) sets the twist angle of the upper frame to a first twist angle (step s103) after the step (b1), and calculates the corrected angle for tilting the upper frame from the twist angle of the lower frame and the first twist angle using the condition 1 or the condition 2 (step s104).

Thereafter, it is judged whether the corrected angle is 0°, and if the corrected angle is 0°, the leveling target against the lower frame is satisfied, and thus the corresponding tilting control is terminated (step s105).

A step (b3) generates a control signal of the actuator for pitching or rolling the upper frame based on the corrected angle, and transmits the control signal to the driving unit if the corrected angle is not 0° at the step (b2).

In this case, the control signal may include first and second control signals. The first and second control signals are generated through the following steps.

The first twist angle is compared with the speed convergence range calculated according to the condition 3 or condition 4, and if the first twist angle is within the speed convergence range, the second control signal for operating the actuator at low speed is generated to protect the user from an impact to be generated due to an abrupt stop of the actuator, while if the first twist angle is not within the speed convergence range, the first control signal for operating the actuator without limiting the operation speed of the actuator is generated (steps s106 to s109).

A step (b4) compares the operation time with a reference operation time predetermined by a user, and if the operation time is equal to or exceeds the predetermined reference operation time, it terminates the corresponding leveling control, while if the operation time is less than the predetermined reference operation time, it returns to the step (b2) to make the corrected angle 0°, or continues the leveling control of the upper frame until the emergency stop condition is satisfied as described above (step s110).

On the other hand, if the emergency stop condition according to user's manipulation of the input unit 10 is satisfied, the leveling control process is immediately terminated.

In this case, the emergency stop condition is satisfied in the case where the control lock lever is activated according to the user's input, the posture controller is varied, the track level mode switch is turned off, the operation state information of the working device originating from the working device exists, or the traveling detection sensor senses the traveling state of the lower frame. The emergency stop condition is judged by the emergency stop module 47, and the emergency stop module transmits a stop command to the respective modules to terminate the corresponding leveling control process.

As described above, according to the system and method for controlling automatic leveling of heavy equipment according to the embodiments of the present invention, the upper frame can be automatically leveled based on the lower frame, and thus the operator's convenience is increased.

Also, a user can directly stop the tilting by inputting the emergency stop condition during the tilting control process, and thus the stability in use is increased.

Also, the control signal for different operation speed of the actuator is generated depending on whether the operation speed is within the speed convergence range, and thus the safety in use can be increased without any vibration or impact generated due to an abrupt stop of the actuator when the tilting control is completed.

What is claimed is:

1. A system for controlling automatic leveling of heavy construction equipment with a lower frame and an upper frame, the lower frame having traveling means, and the upper frame tiltably and swingably connected to the lower frame, the system comprising:
   a sensor unit, provided in the equipment, including an inclination detecting sensor for measuring twist angles of the lower frame and the upper frame against a reference horizontal surface, a traveling detection sensor for measuring a traveling speed of the equipment, and a working device sensor for detecting working state information of a working device;
   a control unit for receiving the twist angles, the traveling speed, and the working state information, calculating a corrected angle at which the upper frame is to be tilted against the lower frame, and generating a control signal for instructing an operation of an actuator; and
   a driving unit for performing a leveling control through the actuator in accordance with the received control signal,
   wherein the control unit comprises:
   a receiving module for receiving from the sensor unit the twist angles of the lower frame and the upper frame, the traveling speed of the heavy construction equipment, and the working state information against a reference horizontal surface;
   a corrected angle calculation module for setting the twist angle of the upper frame as a first twist angle, and calculating the corrected angle from the first twist angle;
   a control signal generation module for generating the control signal in accordance with a period in which the actuator is to be operated, based on the corrected angle;
   an output module for transmitting the control signal to the driving unit; and
   a time limit module for counting the operation time at a start of the leveling control, and if the operation time exceeds a predetermined reference operation time, terminating the performing of the leveling control.

2. The system of claim 1, wherein the control unit further comprises a display signal generation module for generating a display signal for displaying the twist angles of the lower frame and the upper frame through a display unit provided with an image display device.

3. The system of claim 1, wherein the control unit further comprises an emergency stop module for immediately terminating the leveling control if the emergency stop condition is satisfied during the performing of the leveling control.

4. The system of claim 1, wherein the corrected angle of the corrected angle calculation module is calculated as "the twist angle of the lower frame−the first twist angle."

5. The system of claim 4, wherein, if a weight angle is set, the corrected angle is calculated as "the twist angle of the lower frame+the weight angle−the first twist angle."

6. The system of claim 1, wherein the control signal of the control signal generation module is generated in a manner that, if the first twist angle is within the speed convergence range, a second control signal for operating the actuator at low speed is generated, while if the first twist angle is not within the speed convergence range, a first control signal for operating the actuator, which does not limit the operation speed of the actuator, is generated; and
   wherein the speed convergence range is calculated as "the twist angle of the lower frame−a constant angle≦the speed convergence range≦the twist angle of the lower frame +the constant angle".

7. A method for controlling automatic leveling of heavy construction equipment in which a lower frame having a traveling means and an upper frame are combined together by a tilting means that includes a sensor unit, a control unit, and a driving unit, the method comprising the steps of:
   (A) the sensor unit measuring twist angles of the lower frame and the upper frame against a reference horizontal surface as an inclination detecting sensor of the lower frame and the upper frame, measuring a traveling speed of the heavy construction equipment as a traveling detection sensor, and detecting working state information of a working device;
   (B) the control unit calculating a corrected angle at which the upper frame is to be leveled against the lower frame based on the respective twist angles, generating a control signal for operating an actuator according to the corrected angle, and transmitting the control signal to the driving unit; and
   (C) the driving unit performing a leveling control through the actuator on the basis of the control signal,
   wherein step (B) comprises the steps of:
   (b1) counting an operation time for the leveling control;
   (b2) setting the twist angle of the upper frame as a first twist angle after the step (b1), calculating the corrected angle for tilting the upper frame from the twist angle of the lower frame and the first twist angle, and if the corrected angle is 0 degrees, terminating the tilting control:
   (b3) generating a control signal for instructing the operation of the actuator from the corrected angle if the corrected angle is not 0 degrees at the step (b2), and transmitting the control signal to the driving unit; and
   (b4) terminating the leveling control if the operation time is equal to or more than the predetermined reference operation time after the step (b3), while returning to the step (b2) if the operation time is less than the predetermined reference operation time.

8. The method of claim 7, further comprising the step of judging conditions precedent to the leveling control, and if the conditions precedent to the leveling control is not satisfied, terminating the leveling control.

9. The method of claim 8, wherein the conditions precedent to the leveling control are satisfied in the case where the control lock lever is in an inactive state, a posture controller is positioned in the center, the working device is not in an operation state, and the traveling means is in a stop state.

10. The method of claim 7, wherein the corrected angle in the step (b2) is calculated as "the twist angle of the lower frame−the first twist angle."

11. The method of claim 10, wherein, if a weight angle is set, the corrected angle is calculated as "the twist angle of the lower frame+the weight angle−the first twist angle."

12. The method of claim 7, wherein the step of generating the control signal in the step (b3) comprises the steps of:
   (b31) calculating the speed convergence range as "the twist angle of the lower frame−a constant angle≦the speed convergence range≦the twist angle of the lower frame+ the constant angle"; and
   (b32) if the first twist angle is not within the speed convergence range, generating a first control signal for operating the actuator, which does not limit the operation speed of the actuator, while if the first twist angle is within the speed convergence range, generating a second control signal for operating the actuator at low speed.

13. The method of claim 7, wherein the step of performing the tiling control is terminated in the case where the emergency stop condition is satisfied.

14. The method of claim 13, wherein the emergency stop condition is judged by an activation/inactivation of a control lock lever, variation of a posture controller, an on/off state of an track leveling switch, an operation state of the working device, or a traveling state of the traveling means.

* * * * *